G. W. Miles.
Imp'd Mosquito-Nets in Window-Blinds.
No. 71778. Patented Dec. 3, 1867.

United States Patent Office.

GEORGE W. MILES, OF PHILADELPHIA, PENNSYLVANIA.

*Letters Patent No. 71,778, dated December 3, 1867.*

IMPROVED MOSQUITO-NETS IN WINDOW-BLINDS.

*The Schedule referred to in these Letters Patent and making part of the same.*

TO ALL WHOM IT MAY CONCERN:

Be it known that I, GEORGE W. MILES, of Philadelphia, in the county of Philadelphia, and State of Pennsylvania, have invented a new and useful Improvement in Mosquito-Nets for Window-Blinds; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

This invention relates to an improvement in the arrangement of a mosquito-net or gauze in connection with a window-blind, for the purpose of excluding mosquitoes, flies, and bugs, without interfering with ventilation, or the movement of the blind-slats to shut out the light or rain.

The improvement consists in forming the slats of the blinds in two parts, and passing the mosquito-netting through them successively, in such manner as to allow them to close perfectly, and, when opened, to fill the spaces between them, as hereinafter more particularly described.

Figure 1:
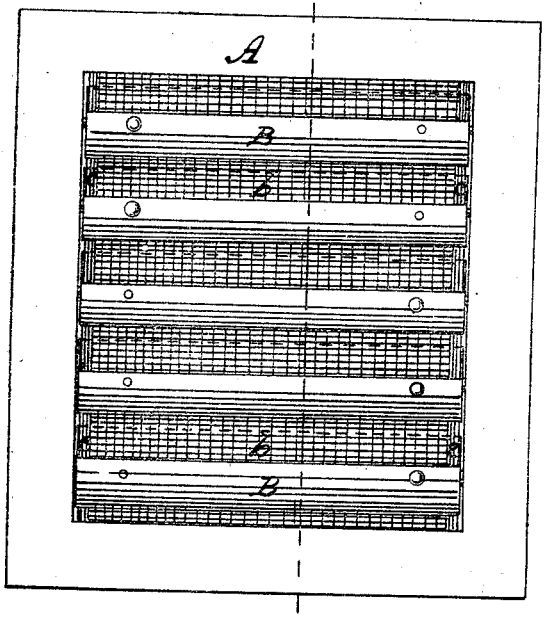
Figure 1 represents a front view of a window-blind provided with my improved mosquito-net.
Figure 2:
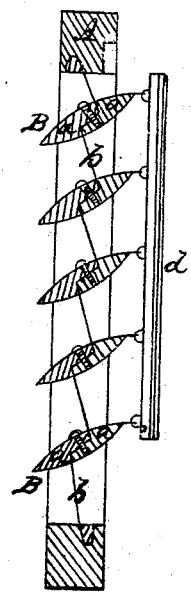
Figure 2 is a vertical cross-section of the same, taken in the line $x\ x$, fig. 1.

A represents a window, in which is placed a window-blind formed with the slats B B, and hung on pivots at the ends of each slat in the usual way; and the blind may be detached from the window-frame, to be raised and lowered, or the slats may be hung in the frame, as represented in fig. 1. The slats B B are each made in two parts, $a\ a$, divided longitudinally down the middle, and fastened together with screws or otherwise, with the gauze or netting $b$ placed between them, from the upper to the lower slat, and clamped firmly therein, the material being arranged so as to be a little full or slack when the slats are closed, and taut when they are wide open, with the bearing or strain only upon the binding $c$ at the sides, which arrangement and its operation are readily seen and understood; the blind being provided with a rod, $d$, attached to it, for opening and closing the slats when they are fixed in a window-frame, as represented in fig. 2.

Having thus described my invention, what I claim as new, and desire to secure by Letters Patent, is—

The compound window-blind slats B B, in combination with the mosquito-netting $b\ b$, constructed, arranged, and operating substantially as and for the purpose herein described.

The above specification of my invention signed by me, this 26th day of September, 1867.

GEORGE W. MILES.

Witnesses:
SAMUEL C. OGLE,
W. OGLE.